United States Patent
Ghosh et al.

[11] Patent Number: 6,117,805
[45] Date of Patent: Sep. 12, 2000

[54] CERAMIC GUIDE RAILS FOR PHOTOGRAPHIC FILM AND PAPER AND POLYMERIC WEB PERFORATION

[75] Inventors: Syamal Kumar Ghosh; Dilip Kumar Chatterjee; Theodore R. Kolb, all of Rochester, N.Y.

[73] Assignee: Eastman Kodak Company, Rochester, N.Y.

[21] Appl. No.: 08/402,670

[22] Filed: Mar. 13, 1995

[51] Int. Cl.⁷ .................................................. C04B 35/48
[52] U.S. Cl. ................ 501/103; 501/104; 396/FOR 956; 396/FOR 957; 396/FOR 958
[58] Field of Search .................... 501/103, 104; 414/908; 396/FOR 956, FOR 957, FOR 958

[56] References Cited

U.S. PATENT DOCUMENTS

| | | | |
|---|---|---|---|
| 4,690,910 | 9/1987 | Tsukuma et al. | 501/103 |
| 4,703,024 | 10/1987 | Aronov | 501/103 |
| 4,977,114 | 12/1990 | Horinouchi et al. | 501/103 |
| 5,290,332 | 3/1994 | Chatterjee et al. | 65/18.1 |
| 5,336,282 | 8/1994 | Ghosh et al. | 51/309 |
| 5,358,913 | 10/1994 | Chatterjee et al. | 501/103 |
| 5,411,690 | 5/1995 | Ghosh et al. | 264/63 |

FOREIGN PATENT DOCUMENTS

| | | |
|---|---|---|
| 0559215A1 | 8/1993 | European Pat. Off. . |
| 0018620 | 1/1985 | Japan .................................... 501/103 |
| 5294560 | 11/1993 | Japan . |

OTHER PUBLICATIONS

Japanese Patent Abstract—"Magneto–Optical Disk Device", Yoshida, JP02–187946 (Jul. 24, 1990). See abstract.
Japanese Patent Abstract—"Transfer Device for Soldering", Masuda et al., JP01–133674 (May 25, 1989). See abstract.
Japanese Patent Abstract—"Feed Device for Machine Tool", Kobayashi et al., JP 61–230835 (Oct. 15, 1986). See abstract.
Japanese Patent Abstract—"IC Guide Rail for IC Handler", Oomomo et al., JP 56–78129 (Jun. 26, 1981). See abstract.

*Primary Examiner*—Paul Marcantoni
*Attorney, Agent, or Firm*—Carl F. Rouff; Susan L. Parulski

[57] ABSTRACT

Ceramic guide rails for guiding photographic film into a perforating machine are disclosed. The ceramic includes zirconium oxide and yttria in a molar ratio of yttria to zirconium oxide of from about 3:97 to about 5:95. The zirconium oxide is essentially the tetragonal phase crystal grain. In an alternate embodiment of the present invention the outer surface of the zirconium oxide is altered to the cubic phase crystal grain or the monoclinic crystal grain.

18 Claims, 2 Drawing Sheets

CERAMIC GUIDE RAILS FOR PHOTOGRAPHIC FILM AND PAPER AND POLYMERIC WEB PERFORATION

FIELD OF THE INVENTION

The present invention relates to the use or ceramic guide rails in a photographic film and paper and polymeric web perforating machine. More particularly, the use of ceramic guide rails in a photographic film perforating machine offers advantages over chrome plated stainless steel guide rails.

BACKGROUND OF THE INVENTION

Perforating equipment for photographic films and papers, use chrome plated stainless steel or a hardened stainless steel as guide rails for conveying films to the feed chute for perforation. Precision perforation on the film edges is required to advance or rewind films in cameras and projection of movie films on the screen. The guide rails in a perforator guide the film edges during transportation into a perforator. The guide rails also locate the film precisely prior to perforation.

There are three guide rails in a typical perforator. The film edges rub against the guide rails at speeds of 100 to 300 feet per minute and create a groove on the chrome plated steel rails in a relatively short time. As the groove deepens with time, the guide rails need to be replaced to ensure the film edges are perfectly aligned under the perforator punches for perforation. Thin chrome plating generally provides an adequate hard, wear resistant surface which does not produce scratches on the film. Thick chrome plating, however, generates a rough surface and is not used on stainless steel guide rails, unless the plating is lapped to generate a smooth surface.

Moreover, photographic films contain corrosive silver halide salts and other additives which attack stainless steel through microcracks or pores in the chrome plating. The corrosion products along with the wear debris tend to contaminate the film which is being perforated.

The present invention replaces the chrome plated stainless steel guide rails with yttria tetragonal zirconia polycrystal ceramic rails. The ceramic rails are in many cases more cost effective and provide superior wear resistance and corrosion resistance than prior art chrome plated stainless guide rails. In addition, the absence of corrosion products and the reduction in wear debris helps reduce film contamination.

SUMMARY OF THE INVENTION

The present invention is a ceramic guide rail or cermamic insert for a stainless steel guide rail which consists of zirconium oxide and yttria wherein the ceramic has a molar ratio of yttria to zirconium oxide of from about 3:97 to about 5:95. The ceramic of the present invention consists essentially of the tetragonal phase crystal grain.

In an alternate embodiment of the present invention the surface of the ceramic guide rail has been modified to the cubic phase crystal grain.

In another alternate embodiment of the present invention the surface of the ceramic guide rail has been modified to the monoclinic phase crystal grain.

For a better understanding of the present invention, together with other advantages and capabilities thereof, reference is made to the following detailed description and appended claims in connection with the preceding drawings and description of some aspects of the invention.

DESCRIPTION OF THE PREFERRED EMBODIMENT

Figure 1:
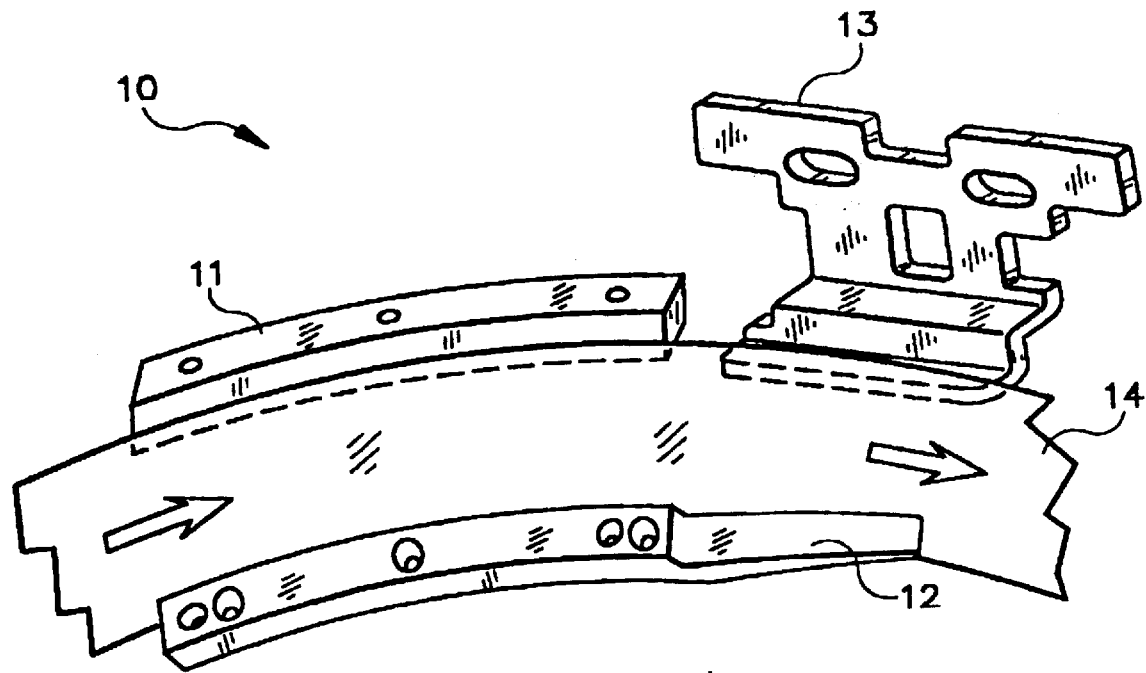
FIG. 1 shows a schematic of a feed chute leading to a perforating machine.

Shown in FIG. 1 is a feed chute 10 for guiding a photographic film strip 14 into a perforator. The feed chute 10 includes a first guide rail 11 positioned on one side of the film strip 14 and a second guide rail 12 positioned on the other side of the film strip. A third guide rail is positioned just prior to the perforating machine (not shown). The perforating machine is located just upstream of the film strip in FIG. 1.

The present invention provides extremely durable and cost effective ceramic guide rails or ceramic inserts for stainless steel guide rails for guiding photographic film into perforating machines. Chrome plated stainless steel guide rails of the prior art do not provide good wear resistance. In addition, chrome plated steel guide rails are prone to corrosion. Loose debris from corrosion contaminates the photographic film. Chrome plated steel guide rails are typically recycled by grinding off the wear grooves and replating the guide rails. After repeated grinding and lapping, the guide rails no longer have the proper dimensional tolerance and must be thrown away.

The present invention uses a novel ceramic material described in U.S. Pat. Nos. 5,336,282 and 5,290,332. The material is yttria alloyed tetragonal zirconium oxide polycrystals (Y-TZP) which contain three to five mole percent of yttria in high purity zirconium oxide. Other alloying compounds like ceria (CeO) or magnesia (MgO) can also be used to achieve similar properties. Materials like silicon carbide, or composites like zirconia reinforced alumina or silicon carbide reinforced alumina may also be used in the present application.

Pure zirconium oxide can exist in three different crystallographic states depending on the melting or sintering temperatures. The monoclinic phase forms at the lowest temperature. As the temperature increases, the monoclinic phase first transforms to a meta-stable tetragonal phase and then to the cubic phase. Cubic and tetragonal phases can be stabilized at room temperature by alloying the zirconia with yttria, calcia, ceria and magnesia.

Figure 2:
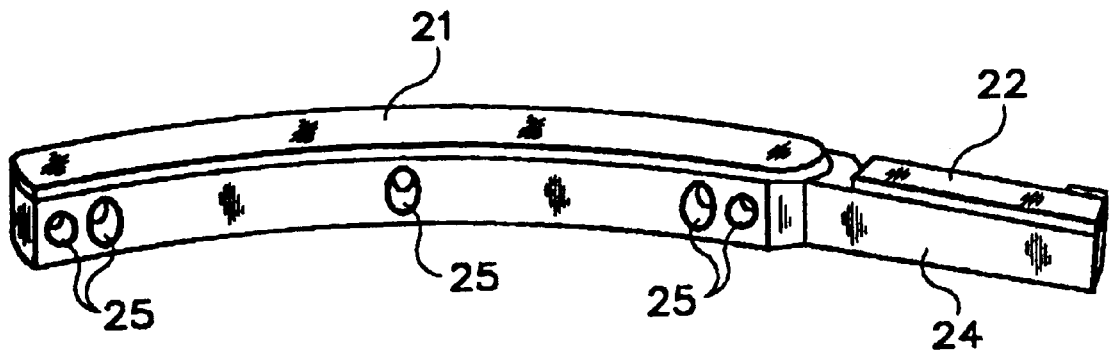
FIG. 2 shows a full length curved ceramic insert guide rail and a straight ceramic insert guide rail.

Shown in FIG. 2 is a full length guide rail used for guiding photographic film into a perforating machine. The guide rail includes a stainless steel guide rail bracket 24, which includes various apertures 25 for mounting. Bonded to the stainless steel guide rail bracket is a curved ceramic (Y-TZP) insert 21. Also shown in FIG. 2 is a full length straight Y-TZP ceramic insert 22.

Figure 3:
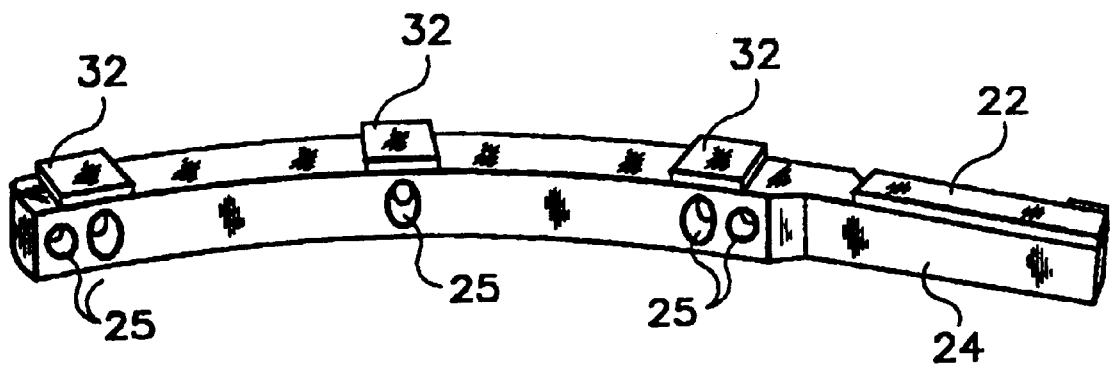
FIG. 3 shows segmented ceramic insert guide rail.

FIG. 3 shows a similar arrangement as in FIG. 2. However, instead of having a full length curved ceramic Y-TZP insert, segmented Y-TZP ceramic insert buttons are shown generally as 32. FIG. 3 also shows a straight Y-TZP ceramic insert 22 along with the stainless steel guide rail bracket 24. The bracket 24 includes various apertures 25 for mounting and adjusting.

Figure 4:
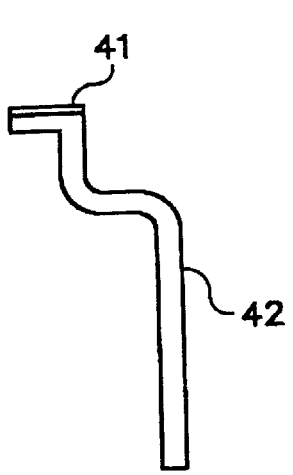
FIG. 4 shows a side view of the stainless guide rail bracket with a ceramic insert.
Figure 5:
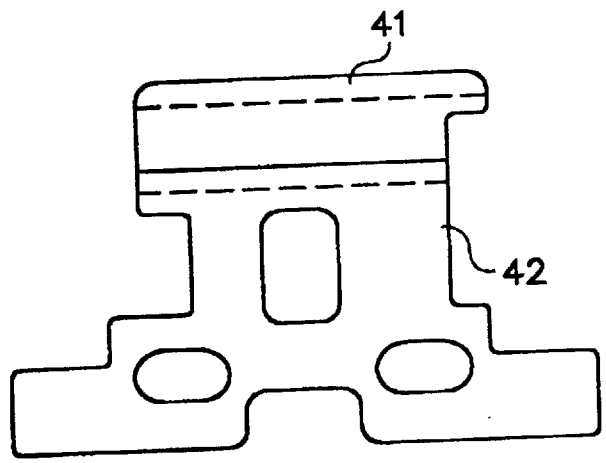
FIG. 5 shows a top view of a stainless steel guide rail bracket and a ceramic insert guide rail.
Figure 6:
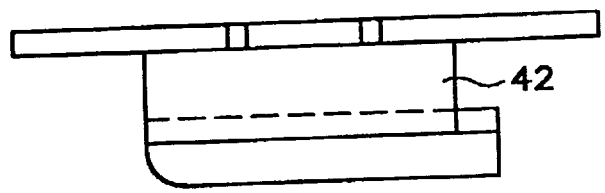
FIG. 6 shows a third view of a stainless steel guide rail bracket including a ceramic insert.

Shown in FIGS. 4–6 is the third guide rail bracket including a ceramic Y-TZP insert. This bracket corresponds to guide rail 13 shown in FIG. 1. FIG. 4 shows a side view which includes the stainless steel guide rail bracket 42 and the ceramic insert 41. In FIGS. 4–6 the ceramic insert is straight. The ceramic inserts are bonded to the stainless steel by using either epoxy, a UV curable photo polymer, or any other known method.

EXAMPLE 1

Zirconium oxide powders were alloyed with up to 5 mole percent yttria, preferable 3 mole percent and calcined to get a single phase tetragonal polycrystal grain structure. These alloyed zirconia powders were cold compacted using high pressure to form green guide rail inserts as shown in FIG. 2. The compacting pressures were varied between 10 and 20 kpsi, preferable 15 kpsi. The green inserts were sintered at temperatures ranging from 1400 to 1600 degrees C. for 2 hours. During sintering, the inserts were placed between 2 flat TZP or alumina plates to keep them from buckling or distorting.

The sintered inserts were then bonded to the stainless steel guide rail brackets with epoxy or a UV curable photo polymer. The top surface of the ceramic insert was then ground and lapped to better than a 4 micro inch finish. These Y-TZP ceramic insert bonded guide rails were placed in a film perforator and tested along side conventional chrome plated stainless steel guide rails. The Y-TZP ceramic inserts lasted 5 to 15 times longer than the stainless steel rails. In addition, the ceramic Y-TZP ceramic guide rails did not show any corrosion which thereby reduced debris and kept the film cleaner.

EXAMPLE 2

The same procedure was used as described in Example 1. During sintering, however, the active surfaces of the Y-TZP ceramic were made cubic by exposing them to a bed of magnesium oxide powder at 1500 degrees C. This modified the outer surfaces to the cubic structure. The modified guide rail inserts were not tested in a film perforator, however, lab experiments suggest that the modified cubic surfaces may have a longer surface life than the unmodified Y-TZP ceramic rail inserts.

EXAMPLE 3

The same procedure was used as described in Example 1. During sintering, however, the active surfaces of the Y-TZP ceramic were made monoclinic by placing them to a bed of very fine approximately 0.3 micrometer) pure zirconia powder at 1500 degrees C. This modified the outer surfaces to the monoclinic structure. The modified guide rail inserts were not tested in a film perforator, however, lab experiments suggest that the modified monoclinic surfaces may have a longer surface life than the unmodified Y-TZP ceramic rail inserts.

While there has been shown and described what at present are considered the preferred embodiments of the present invention, it will be obvious to those skilled in the art that various changes, alterations and modifications may be made therein without departing from the scope of the invention as defined by the appended claims.

What is claimed is:

1. A ceramic guide rail for guiding photographic film and paper without adverse affect on said film and paper comprising a ceramic consisting essentially of zirconium oxide and yttria wherein the ceramic has a molar ratio of yttria to zirconium oxide of from about 3:97 to about 5:95 and wherein the ceramic consists essentially of the tetragonal crystal phase.

2. A ceramic guide rail for guiding photographic film and paper without adverse affect on said film and paper comprising a ceramic consisting essentially of zirconium oxide and yttria wherein the ceramic has a molar ratio of yttria to zirconium oxide of from about 3:97 to about 5:95 and wherein the ceramic comprises a tetragonal crystal phase grain core and a cubic crystal phase grain surface.

3. A ceramic guide rail for guiding photographic film and paper without adverse affect on said film and paper comprising a ceramic consisting essentially of zirconium oxide and yttria wherein the ceramic has a molar ratio of yttria to zirconium oxide of from about 3:97 to about 5:95 and wherein the ceramic comprises a tetragonal crystal phase grain core and a monoclinic crystal phase grain surface.

4. The ceramic guide rail according to claim 1 wherein an outer surface of the guide rail has a 4 micro inch finish.

5. The ceramic guide rail according to claim 2 wherein the surface of the guide rail has a 4 micro inch finish.

6. The ceramic guide rail according to claim 3 wherein the surface of the guide rail has a 4 micro inch finish.

7. The ceramic guide rail according to claim 1 wherein an outer surface of the guide rail is curved.

8. The ceramic guide rail according to claim 2 wherein the surface is curved.

9. The ceramic guide rail according to claim 3 wherein the surface is curved.

10. A ceramic guide rail insert for guiding photographic film and paper without adversely affecting said film and paper bondable to a stainless steel bracket comprising a ceramic consisting essentially of zirconium oxide and yttria wherein the ceramic has a molar ratio of yttria to zirconium oxide of from about 3:97 to about 5:95 and wherein the ceramic consists essentially of the tetragonal crystal phase.

11. A ceramic guide rail insert for guiding photographic film and paper without adversely affecting said film and paper bondable to a stainless steel bracket comprising a ceramic consisting essentially of zirconium oxide and yttria wherein the ceramic has a molar ratio of yttria to zirconium oxide of from about 3:97 to about 5:95 and wherein the ceramic comprises a tetragonal crystal phase grain core and a cubic crystal phase grain surface.

12. A ceramic guide rail insert for guiding photographic film and paper without adversely affecting said film and paper bondable to a stainless steel bracket comprising a ceramic consisting essentially of zirconium oxide and yttria wherein the ceramic has a molar ratio of yttria to zirconium oxide of from about 3:97 to about 5:95 and wherein the ceramic comprises a tetragonal crystal phase grain core and a monoclinic crystal phase grain surface.

13. The ceramic guide rail according to claim 10 wherein an outer surface of the guide rail has a 4 micro inch finish.

14. The ceramic guide rail according to claim 11 wherein the surface of the guide rail has a 4 micro inch finish.

15. The ceramic guide rail according to claim 12 wherein the surface of the guide rail has a 4 micro inch finish.

16. The ceramic guide rail according to claim 10 wherein an outer surface of the guide rail is curved.

17. The ceramic guide rail according to claim 11 wherein the surface is curved.

18. The ceramic guide rail according to claim 12 wherein the surface is curved.

* * * * *